May 3, 1960 P. ROBINSON ET AL 2,935,668
ELECTRICAL CAPACITORS

Original Filed Jan. 5, 1951  2 Sheets-Sheet 1

INVENTORS
P. ROBINSON
D.B. PECK
BY
Arthur G. Connolly
their attorney

May 3, 1960 P. ROBINSON ET AL 2,935,668
ELECTRICAL CAPACITORS

Original Filed Jan. 5, 1951 2 Sheets-Sheet 2

INVENTORS
P. ROBINSON
D. B. PECK

BY
Arthur G. Connolly
their attorney

United States Patent Office 2,935,668
Patented May 3, 1960

2,935,668
ELECTRICAL CAPACITORS

Preston Robinson and David B. Peck, Williamstown, Mass., assignors to Sprague Electric Company, North Adams, Mass., a corporation of Massachusetts Original application January 5, 1951, Serial No. 204,546. Divided and this application June 28, 1956, Serial No. 594,652

4 Claims. (Cl. 317—2.58)

This invention relates to improved electrical capacitors and more particularly refers to capacitors possessing unusual insulation resistance and temperature coefficient characteristics.

Polystyrene has been used to a limited extent as a dielectric material for the fabrication of capacitors with high insulation resistance, low dissipation factor and low temperature coefficient of capacity. There are a number of reasons for limited use it has received. First, to obtain the material in thin film form, the nature of the process is such that pinholes and other flaws occur with frequency sufficient to make impractical the manufacture of single, and even two layer, capacitors. That is, if two layers of 0.0004" polystyrene are employed as the dielectric in a capacitor having a capacity of 0.1 mfd., for example, the percentage of units which will break down in a 500 volt D.C. flash test is high, usually from about 20% to about 60%. Second, the upper temperature limit for capacitor operation is about 70° C., much lower than the ambient temperature in the interior of most electronic equipment chasses. Third, impregnation of capacitors with oil, wax or resin to displace trapped air and/or moisture in the voids of the winding is difficult, if not impossible, even with dielectric materials inert to the polystyrene because of the smoothness of the film. Such replacement of air and moisture is essential for high voltage operation.

These same difficulties exist to a greater or lesser extent with a number of other resin film dielectric materials, as for example, polyethylene, cellulose acetate, polyesters, polytetrafluorethylene, etc.

It is an object of the present invention to overcome the foregoing and related disadvantages. A further object is to produce capacitors having exceptional electrical properties over a wide temperature range, for example, from −55° C. to plus 150° C. A still further object is to produce electrical capacitors having properties similar to those of capacitors employing polystyrene and polyethylene as sole dielectrics without being subject to the various disadvantages of these materials. Additional objects will become apparent from the following description and claims.

These objects are attained in accordance with the invention wherein there is produced a dielectric film comprising a continuous film of strain-free polymer supported by a fibrous matrix. In a more restricted sense, the invention is concerned with an electrical capacitor comprising metal electrode elements separated by dielectric material consisting of a continuous film of a strain-free organic polymer supported on a non-thermoplastic fibrous matrix.

According to the preferred embodiments of the invention, capacitors are produced with a composite dielectric of a permeable matrix such as sheets of cellulose or asbestos fibers, and either polyethylene or polystyrene, processed at a temperature in excess of the transition point of the resin.

The invention is further concerned with the processes for producing the new capacitors, particularly those characterized by exceptional electrical properties over a wide temperature range and/or unusual mechanical stability.

In U.S. patent application bearing S.N. 118,198, filed on September 27, 1949, now Patent No. 2,738,453, there are disclosed new types of electrical devices and particularly resin impregnated capacitors. In this case, capacitors with unusually high insulation resistance and exceptional thermal stability are produced by novel combination of at least two substantially incompatible resins one of which is preferably thermosetting in nature.

In accordance with the present invention a composite dielectric is produced with a porous dielectric spacing material and a thermoplastic resin in the form of a continuous film. This dielectric is processed in a way such that the two materials are to a certain extent interspersed and, in many preferred cases, the capacitor winding itself becomes a durable integral mass. It has been found possible to impregnate capacitors of the invention, to remove trapped air and moisture from the matrix, and further improve upon the characteristics of the capacitors.

The porous spacers applied in accordance with the invention may be selected from a number of available types but in all cases are made up of substantially non-thermoplastic materials. A typical and desirable material is paper such as linen paper or calendered and supercalendered kraft paper. Other materials suitable for use include glass which may be woven or pulped from fiber state to produce a cloth or matte spacer, synthetic fibers such as nylon, preferably cross-linked, high molecular weight condensation polymers of terephthalic acid and a glycol, regenerated cellulose, etc. In defining the substantially non-thermoplastic nature of this porous spacer I mean that it should not flow under the pressures and temperatures involved in processing and operation of the capacitor. That is, while un-cross-linked nylon, for example, is essentially a thermoplastic material, it may be used where the temperature of operation does not approach the transition point of the resin. A further limitation is that the spacer be substantially insoluble in the resin employed as a continuous film in conjunction therewith as well as in the impregnant if one be employed.

The resins employed in accordance with the invention are ordinarily electrical grade materials which for best results possess very high insulation resistance and/or low dissipation factor at the frequencies to be met in capacitor service.

It is essential that they be flexible and in thin film form, e.g. thicknesses on the order of .0001" to about .002". Suitable compounds are polymers and copolymers of polymerizable vinyl compounds such as styrene, ethylene, N-vinyl carbazole, vinyl dibenzofuran, and the like.

Other polymers possessing good electrical properties include polymers resulting from polymerizing partially dehydrogenated xylene, dimethyl naphthalene, etc. Copolymers of the above compounds with butadiene and other conjugated dienes are also of interest. Preferred among the resinous materials are polymers and copolymers of ethylene, styrene and halogenated derivatives thereof. Examples of the latter are polytetrafluoroethylene and polytrifluoromonochloroethylene. Ordinarily these resins are employed as continuous films which are wound into the capacitor structure with the porous spacer. In some instances, however, it is desirable to apply a continuous resin film to one or both sides of the porous spacer with the resin in a manner such as to maintain the continuous film or films of resin, that is, one in which the fibers of the porous spacer do not penetrate the outer resin surface at any point. Ordinarily, a single film is satisfactory. Subsequent impregnation of the porous dielectric matrix may be carried out with assemblies having single or double resin films with a porous spacer, following removal of air and/or moisture from the matrix.

Dielectric impregnants when employed are selected from materials in which the resin has at best a limited solubility under the conditions of impregnation. Subsequent to impregnation substantial swelling of the resin film is permitted and in many cases desired. Among liquid impregnants may be mentioned predominantly aliphatic hydrocarbon polymers such as polyisobutylene (of average molecular weight between about 1,000 and about 5,000); mineral oil, silicone oils, chlorinated and fluorinated hydrocarbons, etc. Waxes such as paraffin, microcrystalline hydrocarbon waxes, and the like may be employed. Further, polymerizable resin impregnants such as styrene, N-vinyl carbazole and related compounds may be employed as impregnants. The selection of the impregnant as indicated above depends upon the particular solvent action on the resin in the capacitor structure, upon the electrical characteristics desired in the final capacitor, upon the maximum operating voltage to be met in operation, and upon the degree of interspering of the resin in the matrix spacer during processing of the capacitor.

It will be apparent from consideration of the above factors that extensive possibilities present themselves for combination of dielectrics to obtain advantages of each and, further, that care must be practiced in such selection. The swelling or solubility of the resin in the impregnant, when the latter is used, must not be sufficient to prevent substantially complete impregnation of the porous spacer. Where good but not outstanding properties are required it is possible to impregnate the capacitor with polar dielectrics such as chlorinated diphenyl, chlorinated naphthalene, and polyester-styrene copolymers.

The processing of the capacitor forms an essential feature of the invention and influences to a great extent the final characteristics thereof. As previously indicated, it has been found possible to achieve unusual and outstanding results by heating the capacitor assembly above the transition point of the resin film. This treatment relieves the strains within the dielectric film and causes the permeation of the matrix with the resin to the extent permitted by the geometry of the system (pore size, resin viscosity, etc.). Characteristics resulting from these changes include greatly improved temperature coefficient of capacity, improved breakdown voltage, and high permissible operating temperature for the capacitor, e.g., temperatures well above the transition point of the resin. By transition point is meant the temperature at which the resin undergoes flow without application of substantial external pressure.

The invention will be further described with reference to the following examples and the drawings which are appended.

Reference is made to the appended drawing, in which.

Figure 1A:
Fig. 1 shows the appearance of the dielectric before and after processing.
Figure 1B:
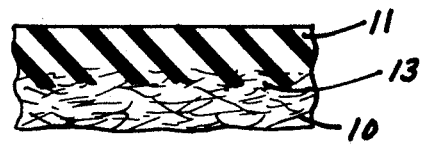

Referring more specifically to Figs. 1A and 1B, 10 represents the fibrous matrix sheet against which is disposed polymer film 11. It should be noted that the film actually contacts only the outermost fibers of the matrix 10, as noted at 12. Fig. 1B shows the dielectric after it has been processed by heat treatment at a temperature in excess of the transition point of the polymer material. It should be noted that the polymer has become interspersed with the fibrous matrix, not only contacting it across the surface junction, but also to some extent impregnating the matrix. The extent of this impregnation depends upon the time and temperature of processing for any given polymer, the porosity and pore opening size of the matrix, etc. This will be discussed in greater detail in later paragraphs.

Figures 2A, 2B:
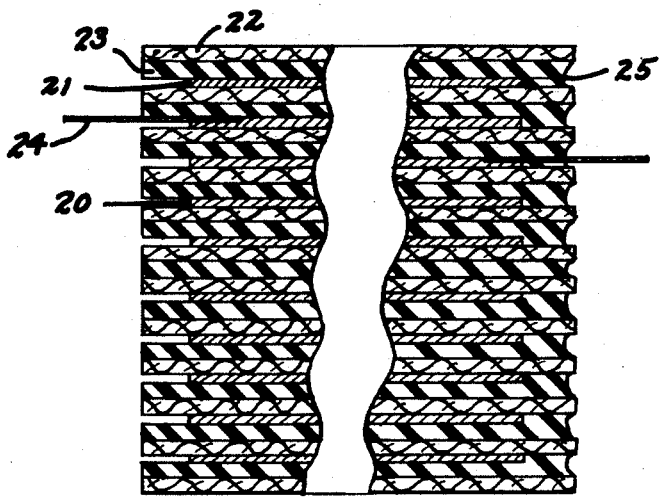
Fig. 2 shows a cross section of an electrical capacitor employing the dielectric film of the invention.

Figs. 2A and 2B show simplified cross sections of a convolutely wound electrical capacitor prior to and following processing in accordance with the invention. 20 and 21 are electrode foils, usually thin aluminum, spaced by porous matrix 22 and continuous, stretched polymer film 23. Terminal tabs, such as 24, are laid against the foil in the usual manner. Fig. 2B shows the capacitor after thermal processing. The resin film 23, having been heated above its transition point, softens to relieve strains and also effectively produce an integral, solid capacitor assembly. The edges, as shown at 25, flow and strengthen the assembly.

Figure 3A:
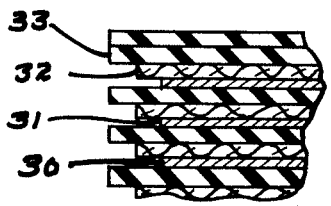
Fig. 3 shows the appearance of a capacitor section produced in accordance with one of the limited embodiments of the invention.
Figure 3B:
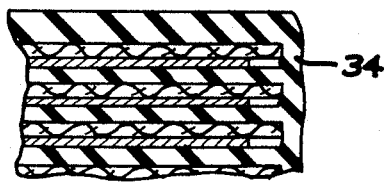

Figs. 3A and 3B show an improved form of the capacitor of Fig. 2. In this instance, the continuous polymer film is greater in width than the fibrous matrix. Electrode foils 30 and 31 are separated by at least one layer of fibrous matrix 32 and at least one layer of continuous polymer film 33. Fig. 3B shows the appearance of the novel combination after thermal processing. The edges of film 33 have fused together to produce a sealed, durable assembly, the fusion being noted at 34. At temperatures below the transition point of the resin, no outside casing or support (such as a can) is thus required. This embodiment is also of particular value in instances where the polymer film is initially stretched to a considerable degree; the removal of strains will result in marked shrinkage. With the wider film, there is no chance that the final capacitor will have the matrix extending beyond the edges of the polymer film.

Fig. 2 shows a capacitor winding with the continuous resin film on the "inside" of the winding, while in Fig. 3, the resin film is shown on the "outside" of winding, with the porous matrix on the "inside" of the winding.

Figure 4A:
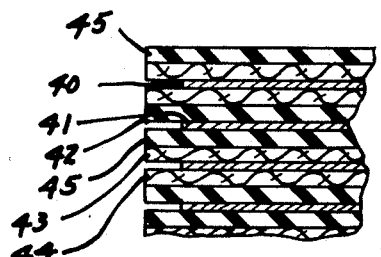
Figure 4B:
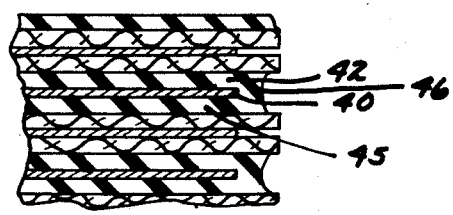

Figs. 4A and 4B show another type of capacitor produced in accordance with the invention. In this instance, the continuous polymer films are both placed adjacent to one of the electrode foils. Foils 40 and 41 are insulated with polymer films 42 and 45, which rest against foil 40 and porous matrix spacers 43 and 44, which rest against foil 41. In Fig. 4B, the condenser is shown as it appears after thermal processing. Films 42 and 45 have fused together as indicated at 46, over the edges of foil 40. Thus foil 40 is completely isolated from the other foil 41 by polymer film, along the edges as well as on the flat surfaces.

Before discussing the details of the selection and processing of the dielectric films and capacitors of the invention, a number of representative examples will be shown, along with pertinent electrical properties.

TABLE I

*High temperature capacitors*

| Key | Construction | Impregnant | Megohm, Mfd. 180 v.D.C. leakage resistance | |
|---|---|---|---|---|
| | | | 125° C. | 150° C. |
| A-1 | 2 x .0003" paper | Polybutene | 52 | 4.5 |
| A-2 | Same as A-1 | None | 72 | 3.2 |
| B | 2 x .001" paper | Polybutene | 92 | 12 |
| C-1 | 1 x .0003" paper, 1 x .0004" polystyrene on the inside. | None | 1,070 | 730 |
| D-1 | 1 x .0004" polystyrene, 1 x .0003" paper on the inside. | ___do___ | 925 | 490 |
| D-2 | Same as C-1 | Polybutene | 880 | 500 |
| E-1 | 1 x .0005" paper, 1 x .0015" polystyrene on the inside. | None | 2,400 | 210 |
| E-2 | Same as E-1 | Polybutene | 1,950 | 670 |
| F-1 | 1 x .001" paper, 1 x .0015" polyethylene on the inside. | ___do___ | 520 | 220 |
| G-1 | 1 x .0015" polyethylene, 1 x .001" paper on the inside. | None | 425 | 180 |
| G-2 | Same as G-1 | Polybutene | 340 | 250 |
| L | 1 x .0004" polystyrene, 2 x .0003" paper, polystyrene in the middle. | ___do___ | 890 | 520 |
| M | 2 x .0004" polystyrene, 1 x .0003" paper in the middle, paper. | None | 22,000 | 3,550 |
| P | 1 x .0004" polystyrene, 1 x .0003" paper, paper on the outside. | Mineral oil | 1,260 | |
| Q | 2 x .0003" paper, 1 x .0004" polystyrene, polystyrene in the middle. | ___do___ | 3,700 | |
| R | 1 x .002" polytetrafluoroethylene, 1 x .002" glass cloth, on the inside. | None | 340@ 200° C. | |
| S | 1 x .0005" paper, 1 x .0004" cellulose acetate, on the inside. | Polybutene | 160 | 75 |
| T | 1 x .002" glass cloth on the inside, 1 x .002" polytrifluoromonochloroethylene. | ___do___ | 200@ 175° C. | |
| U | Same as F-1, with the polyethylene on both sides of one of the foils, as in Figure 4. | ___do___ | 650 | 210 |

EXPLANATORY NOTES (1) Polybutene impregnant was liquid polymer, average M.W. of about 3200. Capacitors were dried for 24 hours at 140° C. and impregnated with polybutene at this temperature.
(2) Mineral oil is a pure hydrocarbon oil, sold under the name "Capacitor oil" by the Sun Oil Company.
(3) "On the inside" refers to the dielectric layer which bears against the inner foil of the convolute winding (see description of Figs. 2 and 3).
(4) Unimpregnated capacitors were dried at 140° C. under 100 microns Hg for 24 hours and sealed while still warm.
(5) Units P, Q, R, S, T and U were round sections. All other units were wound on a ⅛" mandrel, pressed flat, and inserted in a rectangular can before further processing.
(6) The paper (.0003", .0005" and .001") was electrical grade, calendered kraft tissue.
(7) Unit R was heated to 340° C. for 5 minutes before test.
(8) Unit T was heated at 215° C. for 5 minutes before test.

TABLE II

*Capacity change with temperature [1]*

| Temp., ° C. | Percent Change from Room Temp. Capacity | |
|---|---|---|
| | Unit E-2 | Unit E-3 |
| 25 | 0 | 0 |
| 52 | -.38 | -.13 |
| 74 | -.38 | -.23 |
| 102 | -.76 | -.82 |
| 117 | -.84 | -.96 |
| 135 | -.99 | -.36 |
| 153 | -.91 | -.13 |
| 130 | -.11 | +.02 |
| 104 | -.27 | -.44 |
| 78 | +.04 | -.15 |
| 50 | +.38 | +.19 |
| 25 | +.31 | +.19 |

Unit E-3 same as E-2 except round can employed.
[1] At 1000 cycles per second, using General Radio 716-C bridge.

It is important that the moisture be removed from the porous matrix prior to thermal processing of the resin; otherwise, moisture may remain trapped in pores in the matrix of the dielectric sheet with the resultant inferior electrical properties. It is also desirable that the vacuum drying operation be maintained as the temperature is raised through the transition point processing of the resin and that pressure be applied to the assembly containing the dielectric sheets before release of the vacuum. This pressure effect, which results in the interspersing effect, may be achieved simply through the differential expansion of the various elements within the capacitor structure.

It has been found that the resin-film metal foil interface is made substantially gas-free, when the assembly is processed as indicated herein; this may be due to diffusion of the gas from the interface through the resin film, and perhaps even the foil, during the processing under vacuum at elevated temperatures. The expression "dispersing of the resin into the matrix" has been employed herein. This is meant to indicate the removal of all foreign material, such as gas, from the junction between the resin film and the fibers and surface of the matrix. The description of the invention has also included reference to the transition point of the resin. This means the temperature above which the resin is subject to viscous flow without application of outside pressure.

As previously indicated, the polymer film employed in accordance with the invention is preferably pre-stretched. The pre-stretched film is heated above the relaxing temperature of the polymer after incorporation within the capacitor assembly for optimum results. While pre-stretched films are preferred as starting materials, it is possible to employ thermoplastic resins having transition points which have been produced by casting or other means in which strains have not been caused.

According to one of the limited embodiments of the invention, the capacitor is produced with metal electrode foils possessing a certain thermo co-efficient of expansion whose value is above that of the fibrous matrix and below that of the polymer material, the three elements being selected with dimensions and proportions such that the thermal expansions of the polymer plus the fibrous matrix is equivalent to that of the electrode foil. For example, when employing Teflon as the polymer film material, boro silicate glass fiber matte, or cloth, as the non-compressible spacer and aluminum as the electrode foil material, a volume ratio between the Teflon and the glass would be 24 parts to 76 parts.

Reference to Table I will indicate the desirability of impregnating the capacitor sections of the invention with a dielectric impregnant such as polyisobutylene. In addition to increasing the electrical capacity of the capacitor per unit volume a somewhat higher leakage resistance may be obtained. The impregnation with a liquid impregnant does not result in a loss of the rigidity of the capacitor after processing at elevated temperatures provided that the impregnant is selected according to the instructions previously given. For example, capacitors of the type identified as C-2 and D-2 can withstand extremely high acceleration without telescoping of the capacitor section and electrical breakdown of the unit. A capacitor wound with a polystyrene film dielectric per se or paper impregnated with a resinous material such as N-vinyl carbazole, which is subsequently polymerized, will fail at accelerations lower than the values for which comparable sizes and ratings of the capacitors of the invention will stand.

In accordance with another of the limited embodiments of this invention, the polymer-matrix type capacitors of the invention are constructed such that the polymer film, in its substantially continuous form, carries at least 75% and preferably 90% of the voltage gradient of the total dielectric. Expressed differently, it is preferred for D.C. operation that the insulation resistance of the continuous polymer film be at least 7.5 times and preferably 9.0 times as great as that of the matrix layer.

For alternating current operation, the ratio of $e/t$ (where $e$ is the dielectric constant of the layer and $t$ the thickness of the layer) for the matrix layer should be at least three times that of the film layer, although satisfactory results may be obtained when the matrix $e/t$ ratio is twice that of the film.

The ratio of the thickness of the polymer film to the thickness of the porous matrix is ordinarily between about 1:2 and 4:2. The thickness of the film must be at least sufficient to provide for the voltage gradient distribution described in a previous paragraph, that is, such that at least 90% of the D.C. voltage across the capacitor is on the continuous film. For different resins, therefore, the preferred ratios differ, since the resistivity of the dielectrics differ. The thickness of the porous matrix should be sufficient for it to act as a wick for impregnation with another dielectric material, if the latter is desired for highest breakdown voltage. For example, when using a matrix of calendered kraft paper with a density of about 1.05, it is preferred to employ a paper thickness of at least 0.00015 inch in order that impregnation may be accomplished. In the case of asbestos paper, thicknesses used are greater than this, again if impregnation is desired, because of the more pronounced interspersion of the polymer into the matrix during processing of the dielectric above the transition point of the resin. When no subsequent impregnation is to be carried out, it is preferable to operate in the higher ratio range, that is, the ratio between thickness of polymer film and porous matrix being from about 2:2 to about 4:2.

As previously indicated, attempts have been made by many investigators to make capacitors containing polystyrene, as an example, to obtain the capacitance stability and high insulation resistance of the latter. A rolled paper capacitor, impregnated with monomeric styrene which is then polymerized in situ, will not possess these improved characteristics, even if the monomer could be completely polymerized; no continuous film of polymer separates the electrodes and, further, the polymer is not in a strain free form. It has also been proposed to coat one or both sides of paper with the resin as from a solution in toluene of similar solvent. Here again the continuous film is not produced, the fibers sticking out from the matrix, and the moisture may be trapped within the fibers.

Further, if the polymer film and the porous matrix are wound into the capacitor and employed without the thermal processing above the transition point of the resin, capacitance stability, mechanical strength, and other electrical properties do not approach those of the capacitors of the invention.

It has been proposed to laminate resin films to paper bases. This is accomplished by passing the paper and resin film through a high speed calender, the high speed referring to the peripheral speed of the calender roll surface. This process may result in the formation of a continuous resin film on the paper base, and the product may be incorporated in a capacitor assembly to reduce the number of spools. As such, however, the laminated paper does not produce a capacitor having the properties of the capacitors of the invention. The resin of the laminated product is not thoroughly interspersed, according to the definition employed herein, as can be noted by the inferior adhesion of the resin to the paper.

It has been indicated that the processing of the capacitors may be carried out in a number of ways or sequences. To summarize these, it can be stated that the following steps must be included:

(a) Moisture must be removed from fibers (if present), preferably by vacuum drying at temperatures in excess of 100° C.

(b) The dielectric sheet or capacitor must be heated to a temperature exceeding (and preferably by at least 15° C.) the transition point of the polymer.

(c) Pressure should be applied to the dielectric sheet during the time at which the resin is at a temperature above its transition point. This may be accomplished through differential expansion of the elements of the capacitor, if the dielectric is incorporated in a capacitor, or by application of external pressure.

(d) According to a preferred embodiment, and for optimum results, the vacuum, applied during step (a) above is maintained throughout the process, that is steps (b) and (c).

The various preferred embodiments of the invention as described in connection with Figures 2, 3 and 4 are each characterized by certain unusual and useful properties, which make them distinct from each other, even though resulting from the novel application of the same basic thermal processing steps of the invention. The characteristics are summarized below:

(1) Resin film on inside of winding: Highest insulation resistance from a combination of one matrix and one resin film, and very low temperature coefficient of capacity.

(2) Resin film on outside of winding: Very low dissipation factor and very high breakdown voltage.

(3) Resin film on both sides of winding, with matrix in the middle: Exceptionally high insulation resistance and low temperature coefficient of capacity.

(4) Resin film in the middle of winding with impregnated porous matrix on both sides: Highest breakdown voltage with good insulation resistance.

(5) Resin film extended beyond sides of matrix: Best resistance to moisture for winding per se, and optimum physical rigidity.

(6) Tab-type construction (as opposed to extended foil winding): Best physical rigidity for winding per se, since adjacent turns fuse together.

(7) Resin film on both sides of a single foil: Best isolation of electrode of a given polarity from ionic effects.

While the invention has been particularly directed to the electrical capacitor field, it has been found that the process is also particularly suited to the preparation of novel sheets of material for packaging and protective fields. For example, it is possible to make thin, but tough, moisture resistant continuous sheets having compositions as follows:

(a) paper-resin film-paper,
(b) paper-resin film-metal foil,
(c) paper-resin film-metal foil-resin film-paper, as well as related and multiple sheets. This process, which does not involve the use of calenders or other expensive equipment, actually results in a product in which the various elements are thoroughly bonded to each other. The materials are wound together into a large roll and subjected to the thermal processing of steps of the invention, again with the use of a vacuum for optimum results. In the case of (a), layers of paper, resin film and paper are convolutely wound together; in the case of (b) paper, resin and foil are convolutely wound and in the case of (c), paper-resin film-foil-resin film and paper are wound together. It should be noted that there must be paper bearing against paper or paper bearing against foil, or foil bearing against foil, in order that the roll may be unwound. The paper thickness and porosity should be such that the resin will not completely penetrate the material during thermal processing.

It is to be understood that one or more of the electrode foils of the capacitors may consist of a metallized layer, the metallized deposit being placed upon the resin film or even the matrix, although the former is preferred. Suitable electrode elements include zinc, aluminum, tin, silver and the like, which may be deposited by evaporation, sublimation, chemical reduction, etc.

Another resin material suitable for use herein as a continuous dielectric film is the condensation polymer of terephthalic acid and glycol. While the polymer is polar, it possesses very high insulation resistance and can be used as described herein. For low temperature capacitors, the fibers of the resin may be employed as the matrix material with a resin such as polystyrene (where processing temperatures are low).

As many different embodiments of this invention may be made without departing from the spirit and scope hereof, it is to be understood that the invention is not limited to the specific embodiments hereof except as defined in the appended claims.

This application is a division of our copending application S.N. 204,546, filed January 5, 1951, now abandoned.

What is claimed:

1. A capacitor having electrodes insulated from each other by a continuous dielectric spacer laminated from a porous non-thermoplastic layer and a non-porous thermoplastic resin layer, the two layers having a thickness ratio of from 1:2 to 4:2 with the thermoplastic layer from 0.0001 to 0.002 inch thick, and the thermoplastic layer being strain-free and partially interspersed in the porous layer.

2. A convolutely wound capacitor having electrodes insulated from each other by a continuous dielectric spacer laminated from a porous paper layer and a non-porous thermoplastic resin layer, the two layers having a thickness ratio of from 1:2 to 4:2 with the thermoplastic layer from 0.0001 to 0.002 inch thick, the thermoplastic layer being strain-free and partially interspersed in the paper layer, and the pores of the capacitor being impregnated with a dielectric impregnant.

3. The combination of claim 2 in which the non-porous thermoplastic resin is polystyrene.

4. The combination of claim 2 in which the non-porous thermoplastic resin is polyethylene.

References Cited in the file of this patent

UNITED STATES PATENTS

| | | |
|---|---|---|
| 1,746,366 | Schweitzer | Feb. 11, 1930 |
| 2,185,356 | Robertson | Jan. 2, 1940 |
| 2,497,376 | Swallow | Feb. 14, 1950 |
| 2,526,330 | Clark | Oct. 17, 1950 |
| 2,537,126 | Francis | Jan. 9, 1951 |
| 2,623,096 | Robinson | Dec. 23, 1952 |
| 2,676,124 | Foster | Apr. 20, 1954 |
| 2,684,317 | Burnham | July 20, 1954 |
| 2,749,490 | Robinson | June 5, 1956 |
| 2,864,982 | Ruscetta et al. | Dec. 16, 1958 |